(12) United States Patent
Guo et al.

(10) Patent No.: US 9,462,275 B2
(45) Date of Patent: Oct. 4, 2016

(54) RESIDUAL QUAD TREE (RQT) CODING FOR VIDEO CODING

(71) Applicant: QUALCOMM Incorporated, San Diego, CA (US)

(72) Inventors: Liwei Guo, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 13/748,257

(22) Filed: Jan. 23, 2013

(65) Prior Publication Data

US 2013/0195199 A1   Aug. 1, 2013

Related U.S. Application Data

(60) Provisional application No. 61/592,478, filed on Jan. 30, 2012.

(51) Int. Cl.
*H04N 7/12* (2006.01)
*H04N 19/91* (2014.01)
*H04N 19/463* (2014.01)

(52) U.S. Cl.
CPC ...... *H04N 19/00951* (2013.01); *H04N 19/463* (2014.11); *H04N 19/91* (2014.11)

(58) Field of Classification Search
None
See application file for complete search history.

(56) References Cited

U.S. PATENT DOCUMENTS

| 2009/0232204 A1 | 9/2009 | Lee et al. |
| 2012/0183080 A1* | 7/2012 | Zhou .................. 375/240.26 |
| 2012/0195379 A1 | 8/2012 | Alshin et al. |
| 2012/0201298 A1* | 8/2012 | Panusopone et al. ... 375/240.12 |
| 2012/0207222 A1* | 8/2012 | Lou et al. ............ 375/240.18 |
| 2012/0230421 A1 | 9/2012 | Chen et al. |

(Continued)

FOREIGN PATENT DOCUMENTS

| EP | 1619901 A2 | 1/2006 |
| WO | 2011128365 A1 | 10/2011 |
| WO | 2012090504 A1 | 7/2012 |

OTHER PUBLICATIONS

International Preliminary Report on Patentability from International Application No. PCT/US2013/022984, dated Oct. 10, 2014, 7 pp.

(Continued)

*Primary Examiner* — Jeremiah C Hallenbeck-Huber
*Assistant Examiner* — Samuel D Fereja
(74) *Attorney, Agent, or Firm* — Shumaker & Sieffert, P.A.

(57) ABSTRACT

A video decoding device receives an array of transform coefficients for a chroma component of video data. The video decoding device receives entropy encoded data representing the value of a split flag associated with the chroma component. The value of the split flag indicates whether the array of transform coefficients is divided into smaller transform blocks. The video decoding device determines a context for the entropy encoded data representing the split flag. The context is based on the value of a split flag associated with another component of video data. The video decoding device entropy decodes the data representing the value of the split flag based on the determined context using context adaptive binary arithmetic coding (CABAC). The luma and chroma components have independent residual quadtree (RQT) structures.

33 Claims, 11 Drawing Sheets

(56) References Cited

U.S. PATENT DOCUMENTS

2013/0034157 A1* 2/2013 Helle et al. ............... 375/240.12
2013/0051452 A1* 2/2013 Li et al. .................... 375/240.01

OTHER PUBLICATIONS

Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, 259 pp.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, 290 pp.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, 261 pp.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, 290 pp.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Weigand et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].

Weigand et al., "WD3: Working Draft 3 of High-Efficiency Video Coding," Document JCTVC-E603, 5th Meeting: Geneva, CH, Mar. 16-23, 2011, 193 pp.

Weigand et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Bross et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

International Search Report and Written Opinion—PCT/US2013/022984—ISA/EPO—Mar. 13, 2014, 10 pp.

Reply to Written Opinion mailed Mar. 13, 2014, from international application No. PCT/US2013/022984, dated Jun. 12, 2014, 33 pp.

Second Written Opinion from corresponding PCT Application Serial No. PCT/US2013/022984 dated Aug. 6, 2014 (6 pages).

\* cited by examiner

Quad-tree decomposition of CU into TUs

Level diagram of quad-tree decomposition

Quad-tree decomposition into non-square blocks

Quad-tree decomposition into non-square blocks

RESIDUAL QUAD TREE (RQT) CODING FOR VIDEO CODING

RELATED APPLICATIONS

This application claims the benefit of:

U.S. Provisional Application No. 61/592,478, filed Jan. 30, 2012, which is hereby incorporated by reference in its entirety.

TECHNICAL FIELD

This disclosure relates to video coding and compression and, more particularly, to Residual Quad Tree (RQT) coding for partitioning coding units.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices may implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. Video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure relates to video coding and compression, and describes techniques for determining and signaling partitioning schemes, such as residual quad-tree (RQT)-based partitioning structures, for coding units to produce transform units. In particular, the disclosure describes techniques for signaling split flags such that RQT structures can be determined for each of the Y, U and V components in video coding.

In one example, this disclosure describes a method for decoding video data comprising receiving entropy encoded data representing the value of a first split flag associated with an array of transform coefficients for a first chroma component of video data, wherein the value of the first split flag indicates whether the array of transform coefficients for the first chroma component is divided into smaller transform blocks, determining a context for the entropy encoded data representing the first split flag, wherein the context is based at least in part on a value of a second split flag associated with an array of transform coefficients for a second component of video data, entropy decoding the data representing the value of the first flag based on the determined context using context adaptive binary arithmetic coding (CABAC), and reconstructing video data based on the value of the first split flag.

In another example, the disclosure describes a video decoding device comprising one or more processors configured to receive entropy encoded data representing the value of a first split flag associated with an array of transform coefficients for a first chroma component of video data, wherein the value of the first split flag indicates whether the array of transform coefficients for the first chroma component is divided into smaller transform blocks, determine a context for the entropy encoded data representing the first split flag, wherein the context is based at least in part on a value of a second split flag associated with an array of transform coefficients for a second component of video data, entropy decode the data representing the value of the first flag based on the determined context using context adaptive binary arithmetic coding (CABAC), and reconstruct video data based on the value of the first split flag.

In another example, the disclosure describes a non-transitory computer-readable medium comprising instructions stored thereon that when executed cause one or more processors to receive entropy encoded data representing the value of a first split flag associated with an array of transform coefficients for a first chroma component of video data, wherein the value of the first split flag indicates whether the array of transform coefficients for the first chroma component is divided into smaller transform blocks, determine a context for the entropy encoded data representing the first split flag, wherein the context is based at least in part on a value of a second split flag associated with an array of transform coefficients for a second component of video data, entropy decode the data representing the value of the first flag based on the determined context using context adaptive binary arithmetic coding (CABAC), and reconstruct video data based on the value of the first split flag.

In another example, the disclosure describes an apparatus for decoding video data comprising means for receiving entropy encoded data representing the value of a first split flag associated with an array of transform coefficients for a first chroma component of video data, wherein the value of the first split flag indicates whether the array of transform coefficients for the first chroma component is divided into smaller transform blocks, means for determining a context for the entropy encoded data representing the first split flag, wherein the context is based at least in part on a value of a second split flag associated with an array of transform coefficients for a second component of video data, means for entropy decoding the data representing the value of the first flag based on the determined context using context adaptive binary arithmetic coding (CABAC), and means for reconstructing video data based on the value of the first split flag.

In one example, the disclosure describes a method for encoding video data comprising generating a first split flag, wherein the value of the first split flag indicates whether an array of transform coefficients for a first chroma component of video data is divided into smaller transform blocks, determining a context for the first split flag, wherein the context is based at least in part on a value of a second split flag associated with an array of transform coefficients for a second component of video data, entropy encoding the first split flag based on the determined context using context adaptive binary arithmetic coding (CABAC), and outputting entropy encoded data representing the value of the first split flag as part of a bitstream.

In another example, the disclosure describes a video encoding device comprising one or more processors configured to generate a first split flag, wherein the value of the first split flag indicates whether an array of transform coefficients for a first chroma component of video data is divided into smaller transform blocks, determine a context for the first split flag, wherein the context is based at least in part on a value of a second split flag associated with an array of transform coefficients for a second component of video data, entropy encode the first split flag based on the determined context using context adaptive binary arithmetic coding (CABAC), and output entropy encoded data representing the value of the first split flag as part of a bitstream.

In another example, the disclosure describes a non-transitory computer-readable medium comprising instructions stored thereon that when executed cause one or more processors to generate a first split flag, wherein the value of the first split flag indicates whether an array of transform coefficients for a first chroma component of video data is divided into smaller transform blocks, determine a context for the first split flag, wherein the context is based at least in part on a value of a second split flag associated with an array of transform coefficients for a second component of video data, entropy encode the first split flag based on the determined context using context adaptive binary arithmetic coding (CABAC), and output entropy encoded data representing the value of the first split flag as part of a bitstream.

In another example, the disclosure describes an apparatus for encoding video data comprising means for generating a first split flag, wherein the value of the first split flag indicates whether an array of transform coefficients for a first chroma component of video data is divided into smaller transform blocks, means for determining a context for the first split flag, wherein the context is based at least in part on a value of a second split flag associated with an array of transform coefficients for a second component of video data, means for entropy encoding the first split flag based on the determined context using context adaptive binary arithmetic coding (CABAC), and means for outputting entropy encoded data representing the value of the first split flag as part of a bitstream.

The details of one or more examples are set forth in the accompanying drawings and the description below. Other features, objects, and advantages will be apparent from the description and drawings, and from the claims.

DETAILED DESCRIPTION

Figure 1:
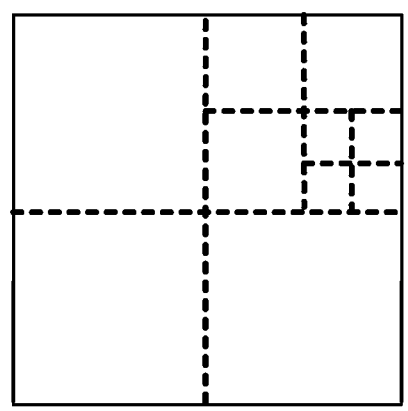
FIG. 1 is a conceptual diagram illustrating an example of a quad-tree decomposition structure of a transform unit.

According to some video coding standards, the luma component (Y) and each of the chroma components (U, V) of a video block share the same quadtree decomposition structure for transform unit (TU) partitioning. While this allows for only one transform split flag to be signaled per transform block, where the flag is shared among the luma and chroma color components, each of the color components may have different characteristics. Thus, having an independent quadtree decomposition structure for each color component may result in more optimal transform unit partitioning. However, independent quadtree decomposition structure may require signaling additional split flags. According to some of the example techniques described herein, a context used to entropy encode a split flag for one color component may be based on the value of a split flag of another color component. In this manner, any additional split flags may be efficiently signaled in an encoded bitstream.

Digital video devices implement video compression techniques to encode and decode digital video information more efficiently. Video compression techniques may be defined according to a video coding standard. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG).

HEVC standardization efforts are based on an evolving model of a video coding device referred to as the HEVC Test Model (HM). The HM presumes improvements in capabilities with respect to video coding devices available during the development of other previous video coding standards, e.g., ITU-T H.264/AVC. For example, whereas H.264 provides nine intra-prediction encoding modes, HEVC provides as many as thirty-five intra-prediction encoding modes. A recent working Draft (WD) of HEVC, referred to as "HEVC Working Draft 6" or "WD6," is described in document JCTVC-H1003, Bross et al., "High-Efficiency Video Coding (HEVC) text specification draft 6," Joint Collaborative Team on Video Coding (JCT-VC) of ITU-T SG16 WP3 and ISO/IEC JTC1/SC29/WG11, 7th Meeting: Geneva, C H, November, 2011. Further, another recent working draft of HEVC, referred to as "HEVC Working Draft 9" or "WD9," is described in document JCTVC-K1003_v7, Bross et al., "High Efficiency Video Coding (HEVC) Text Specification Draft 9," Joint Collaborative Team on Video Coding (JCT-VC) of ITU-T SG16 WP3 and ISO/IEC JTC1/SC29/WG11, 11th Meeting: Shanghai, C H, October, 2012. The HEVC standard may also be referred to as ISO/IEC 23008-HEVC, which is intended to be the standard number for the delivered version of HEVC. Coding according to some of the presently proposed aspects of the developing HEVC standard will be described in this application for purposes of illustration. However, the techniques described in this disclosure may also be useful for and applied to other video coding processes, such as those defined according to ITU-T H.264 or other standard or proprietary video coding processes.

A typical video encoder operating according to a video coding standard, such as HEVC WD6, partitions each frame (i.e., picture) of an original video sequence into contiguous rectangular regions, which may be referred to as video blocks. These blocks may be encoded by applying spatial (intra-frame) prediction and/or temporal (inter-frame) prediction techniques to reduce or remove redundancy inherent in video sequences. A spatial prediction may be referred to as an "intra mode" (I-mode), and a temporal prediction may be referred to as an "inter mode" (P-mode or B-mode). Prediction techniques generate a predictive block of video data, which may also be referred to as a block of reference samples. A block of original video data to be coded is compared to the predictive block. The difference between the original block of video data and the predictive block may be referred to as residual data. Residual data is typically an array of the difference values, indicating differences between samples of a predictive block and pixel values of the original block of video data.

A transform, e.g., a discrete cosine transform (DCT), an integer transform, a wavelet transform, or a conceptually similar transform may be applied to the residual data during the coding process to generate a corresponding set of transform coefficients. Transform coefficients may also be referred to as weighs. Thus, the original block of video can be reconstructed by performing an inverse transform on the transform coefficients and adding the residual data to the predictive block. Transform coefficients may also be quantized. Quantized transform coefficients may be referred to as transform coefficient levels. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m. Quantization introduces loss of information. Thus, quantized coefficients have lower precision than the original coefficients. In addition to transform coefficients, syntax elements, such as motion vectors, may also be quantized. These, plus some control information, form a complete coded representation of the video sequence. The compression ratio, i.e., the ratio of the number of bits used to represent original video sequence and the compressed video sequence, may be controlled by adjusting the value of the quantization parameter (QP) used when quantizing transform coefficients.

Following quantization, entropy coding of the quantized data may be performed, thereby further reducing the number of bits needed for their representation. Entropy coding is a lossless operation aimed at minimizing the number of bits required to represent transmitted or stored symbols by utilizing properties of their distribution (some symbols occur more frequently than others). Entropy encoding may be perform according to, for example, content adaptive variable length coding (CAVLC), context adaptive binary arithmetic coding (CABAC), probability interval partitioning entropy coding (PIPE), or another entropy coding methodology. Entropy coding of syntax elements, such as a syntax element defining a prediction mode, may also be performed. The compression ratio also depends on the method of entropy coding employed.

For video coding according to HEVC, as one example, a video frame may be partitioned into coding units. Coding units (CUs) may also be referred to as treeblocks or coding nodes. In general, the working model of the HM describes that a video frame or picture may be divided into one or more slices, where a slice includes a sequence of consecutive treeblocks in coding order. A treeblock has a similar purpose as a macroblock of the H.264 standard, and may alternatively be referred to as a largest coding unit (LCU). A coding unit generally refers to a rectangular image region that serves as a basic unit to which various coding tools are applied for video compression. A CU usually has a luminance component, denoted as Y, and two chroma components, denoted as U and V. The two chroma components U and V may also be denoted by $C_b$ and $C_r$, respectively. A CU may be considered an array of video sample values. Video sample values may also be referred to as picture elements, pixels, or pels. The size of a CU may be defined according to a number of horizontal and vertical samples and is usually defined according to the number of horizontal and vertical luma samples. Thus, a CU may be described as an N×N or N×M CU.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

To achieve better coding efficiency, a CU may have variable sizes depending on video content. According to HEVC, syntax data within a bitstream may define an LCU size, which is a largest CU for a frame or picture in terms of the number of luma samples. In typical video coding applications an LCU may be 64×64, 32×32, or 16×16 luma samples. CUs of other dimensions may be generated by recursively partitioning an LCU into sub-CUs. The size of the CU may range from 8×8 pixels up to the size of the treeblock with a maximum of 64×64 pixels or greater. Syntax data for a bitstream may define a maximum number of times an LCU may be split, referred to as CU depth. Accordingly, a bitstream may also define a smallest coding unit (SCU). Typically, an SCU includes 8×8 luma samples.

Thus, in one example, four 32×32 CUs may be generated by partitioning a 64×64 LCU into four sub-CUs and each of the 32×32 CUs may be further partitioned into sixteen 8×8 CUs.

Each treeblock may be split into CUs according to a quadtree partitioning scheme. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split and may also define a minimum size of the coding nodes.

A CU may be partitioned into smaller units for purposes of prediction or transform. According to the HEVC WD6, a CU may include one or more prediction units (PUs) and/or one or more transform units (TUs). This disclosure also uses the term "block," "partition," or "portion" to refer to any of a CU, PU, or TU. In general, "portion" may refer to any sub-set of a video frame. Further, this disclosure typically uses the term "video block" to refer to a coding node of a CU. In some specific cases, this disclosure may also use the term "video block" to refer to a treeblock, i.e., LCU, or a CU, which includes a coding node, PUs and TUs. Thus, a video block may correspond to a coding node within a CU and video blocks may have fixed or varying sizes, and may differ in size according to a specified coding standard.

In general, a PU includes data related to the prediction process. A PU may represent all or a portion of the corresponding CU, and may include data for retrieving a reference sample for the PU. PUs may have square or rectangular shapes. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The HM supports prediction using various PU sizes. Syntax data associated with a CU may describe partitioning of the CU into one or more PUs. For example, if a CU is coded using an inter-prediction, it may be divided into four rectangular PUs where each PU includes information identifying a set reference samples in a temporally adjacent frame. The sets of reference samples may be combined to form a predictive video block. As described above, the predictive video block may be subtracted from the CU to form residual data. In addition, assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

As described above, a transform operation may be applied to residual data to transform the residual data from a pixel domain to a transform domain. A TU represents the size of a set of pixel difference values for purposes of performing transformation and generating a corresponding set of transform coefficients. Thus, a transform block or TU may refer to either a set of residual data to which a transform is applied or a set of transform coefficient values. The size of a TU may be the same as the size of a CU or a CU may be partitioned into a plurality of TUs. Syntax data associated with a CU may also describe, for example, partitioning of the CU into one or more TUs according to a quadtree. TUs may be sized based on the size of PUs within a given CU defined for a partitioned LCU, although this may not always be the case. The TUs may be the same size or smaller than the PUs, or possibly larger than the PUs. For example, transforms may be performed based on different size of blocks, such as 4×4, 8×8, or 16×16 and larger. Rectangular shape transform blocks may also be used, e.g. 16×4, 32×8, etc. For example, one transform may be performed on the residual values associated with the 16×16 array of luma samples or a transform may be performed on each of four 8×8 arrays of luma samples. Larger TUs generally provide more compression with more perceivable "blockiness" in a reconstructed image, whereas smaller TUs generally provide less compression with less perceivable "blockiness." The selection of TU sizes may be based on rate-distortion optimization analysis. Rate-distortion analysis generally determines an amount of distortion (or error) between a reconstructed block and an original, (i.e., unencoded block) as well as a bitrate (i.e., a number of bits) used to encode the block.

Similar to an LCU, a TU may be recursively partitioned into smaller TUs using a tree structure. That is, residual samples corresponding to a CU may be subdivided into smaller units using a residual quad-tree (RQT) and the leaf nodes of the RQT may be referred to as TUs. The TU structure or transform block structure that results from partitioning a TU into smaller TUs may be referred to as a transform tree.

FIG. 1 is a conceptual diagram illustrating a quad-tree decomposition structure where a TU is either split or not split into four quarter-sized blocks at successive levels or depths. In FIG. 1, the whole block with solid lines is the original TU, which may correspond to the original CU. The dashed lines indicate one outcome of transform block decomposition according to a quad-tree structure, i.e., RQT decomposition. It should be noted that decomposition illustrated in FIG. 1 is one of several possible decomposition outcomes.

In the quad-tree decomposition structure illustrated in FIG. 1, a decision is made whether a block is either not split or split into four quarter-sized blocks. As illustrated in FIG. 1, there are four levels of transform decompositions. At the first level (i.e., level-0 decomposition depth0), which corresponds to the whole coding unit, the coding unit is split into quarter-sized transform blocks. Then, at the second level (i.e., level-1 or depth1), the second (i.e., in the raster scan) quarter-sized transform block is further split into four 1/16 sized transform blocks. Then, at the third level (i.e., level-2 or depth2), the fourth 1/16 sized transform block is further split into four even smaller transform blocks. During the encoding process, a video encoder may determine whether a transform block should be further split based on rate-distortion optimization analysis.

To signal a tree decomposition structure in an encoded video bitstream, a series of a transform split flags may be used. This series of split flags can be used to define a RQT structure. Each flag may correspond to a level (i.e., depth) in the RQT, where a flag value of 0 indicates no further splitting at the current block depth, and a flag value of 1 indicates that the current block depth is to be split into four, additional quarter-sized blocks. For each block, a transform split flag may be coded by a video encoder to indicate if a block is to be further split.

Figure 2:
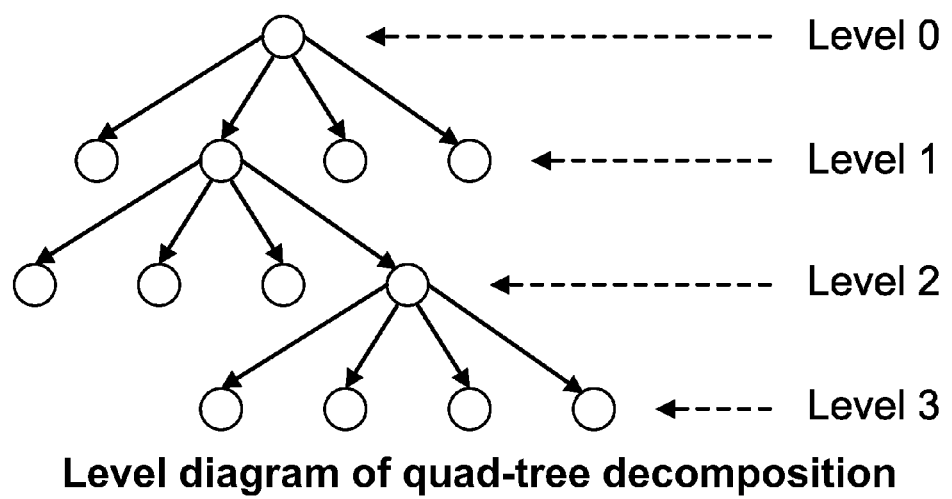
FIG. 2 is a conceptual diagram illustrating quad-tree decomposition levels.

FIG. 2 is a level diagram illustrating a quad-tree decomposition. FIG. 2 illustrates one example of a level diagram that may be used to signal the quad-tree decomposition illustrated in FIG. 1. As illustrated in FIG. 2, at different decomposition levels, a transform split flag can be signaled as follows:

Level 0: 1
Level 1: 0, 1, 0, 0
Level 2: 0, 0, 0, 1
Level 3: 0, 0, 0, 0

At level 0, which is the coding unit level, a flag of 1 is signaled because the transform is further split. At level 1, only the second quarter-sized block is further split, so flags of 0, 1, 0, 0 are sent in the encoded bitstream by a video encoder. At level 2, since other blocks are not further split, only the second quarter-sized block needs to be further signaled by a video encoder. In the second quarter-sized block, only the 4th block is to be further split, so flags of 0, 0, 0, 1 are sent at level 2 by the video encoder. At level 3, no block is to be further split, so flags of 0, 0, 0, 0 are sent. For clarification, it should be mentioned that in the present disclosure, a smaller level or depth value means that the level is closer to the root level in the decomposition structure. As illustrated in FIG. 1 and FIG. 2, level 0 is the root level. A maximum depth (i.e., level) value may be defined for a quad-tree, where the maximum depth value indicates the how far splitting can occur from the root level. In this manner, the maximum depth value may be used to indicate the size of the smallest possible TU for a CU. In the example illustrated in FIG. 1, blocks are only split into square shape sub-blocks. However, in other decomposition techniques, such as those described in HEVC WD6, a block can also be split into rectangular shaped sub-blocks.

Figure 3A:
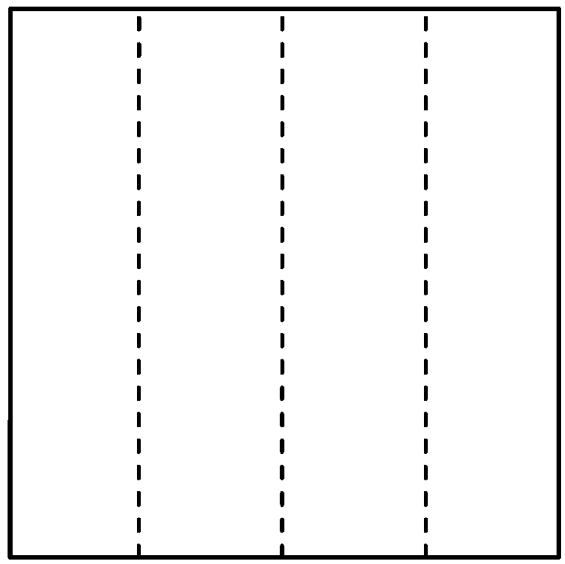
FIGS. 3A and 3B are conceptual diagrams illustrating a quad-tree decomposition structure of a transform unit.
Figure 3B:
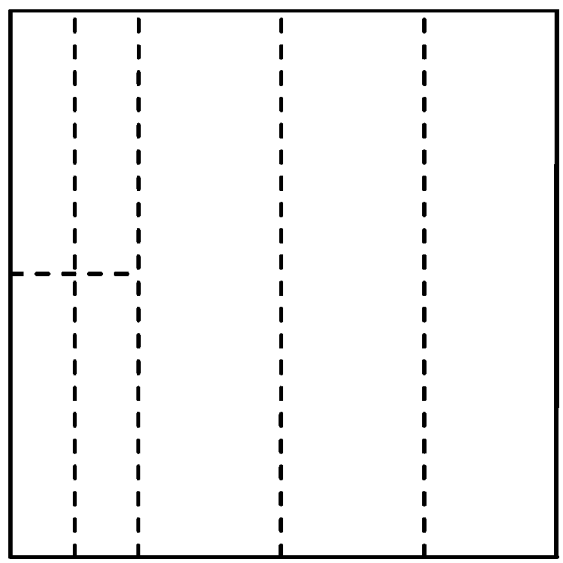

FIGS. 3A and 3B are conceptual diagrams illustrating a quad-tree decomposition structure where a TU is either split or not split into four non-square blocks. As illustrated in FIG. 3A, a TU can be partitioned into four smaller non-square blocks for transform purposes. Further, as illustrated in FIG. 3B, a non-square decomposition structure may also be recursive. For example, as illustrated in FIG. 3B, the first sub-block may be further partitioned into four even smaller non-square blocks with a size of ¹⁄₁₆th of the original block.

As described above, a CU may have three components, such as, for example, Y, U and V. It should be noted that other techniques and color spaces may also be used to represent color video data, such as RGB, but YUV are be described herein for purposes of illustration. According to HEVC WD6, for a CU, its luma component Y and its chroma components, U and V, share the same quadtree decomposition structure for TU partitioning. Thus, in current HM reference software, all of the three components share the same RQT structure. That is, if a split flag=1 in the RQT structure, all three components are further divided into smaller transform blocks at this level. While this allows for only one transform split flag to be signaled per transform block, where the flag is shared among the Y, U and V components, each of Y, U, and V can each have different characteristics. For example, U and V are generally smoother than Y. Therefore, a transform decomposition structure based on the characteristics of the Y component may not be optimal for U and V.

In some cases, the optimal transform for U and V may be at a lower depth (corresponding to a larger transform size) than Y. In other words, it may be desirable to split the Y component block into smaller partitions than the U and V component blocks, or possibly vice versa in other cases. It should be noted that some techniques, such as those described in co-pending U.S. patent application Ser. No. 13/414,232, filed Mar. 7, 2012, which is hereby incorporated by reference in its entirety, include where, for a RQT, a first maximum depth is defined for the luma component and a second maximum depth is defined for the chroma components. Having a first maximum depth for the luma component and a second maximum depth for the chroma components, does necessarily provide independent for partitioning of each of the Y, U, and V components, i.e., low level split flags (e.g., Level 0 and Level 1) are shared for Y, U, and V.

In addition to split flags, HEVC WD6 includes a coded block flag (CBF) syntax element that indicates if a block of transform coefficients or transform includes any non-zero transform coefficients. Coded block flag signaling is closely associated with a transform block structure, and signaled by the video encoder in a top-down hierarchical manner. For example, when a coded block flag at a lower decomposition level is 0, then there is no further signaling of coded block flags at higher levels for that video component (where a lower level is closer to the root and a higher level is further from the root). In this case, the corresponding higher level coded block flags are all inferred to be 0. In other words, when the coded block flag is coded at a certain level of decomposition, coded block flags at higher levels are only needed when the coded block flag at the current decomposition level is not zero.

As described above, a video coding standard may entropy code syntax elements according to a CABAC technique. To apply CABAC coding to a syntax element, a video coder may perform binarization on a syntax element. Binarization refers to the process of converting a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, exponential Golomb coding, and Golomb-Rice coding. For example, binarization may include representing the integer value of 5 as 00000101 using an 8-bit fixed length technique or as 11110 using a unary coding technique.

After binarization, a video coder may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, the video coder may arithmetically code that bin based on the context. Bins coded using a regular CABAC coding may be referred to as "CABAC bins."

Further, rather than performing regular CABAC encoding on all syntax elements, a video coder may code some syntax elements (e.g., bins) using bypass CABAC coding. Bypass coding refers to the process of arithmetically encoding a bin without using an adaptive context. That is, the bypass coding engine does not select contexts and may assume a probability of 0.5 for both symbols (0 and 1). Although bypass coding may not be as bandwidth-efficient as CABAC coding, it may be computationally less expensive to perform bypass coding on a bin rather than to perform regular CABAC coding on the bin. Further, performing bypass coding may allow for a higher degree of parallelization and throughput. Bins coded using bypass coding may be referred to as "bypass bins." The binarization of a syntax element, whether a particular bin is CABAC coded or bypassed coded, and/or the context used to encode a bin may be based on the value of another syntax element.

In view of the characteristics of the TU partitioning techniques described in HEVC WD6, the present disclosure describes techniques for signaling an independent quadtree decomposition structure for color components of video data. According to some of the example techniques described herein, a context used to entropy code a split flag for one color component may be based on the value of a split flag of another color component. In this manner, any additional split flags may efficiently signaled in an encoded bitstream.

Figure 4:
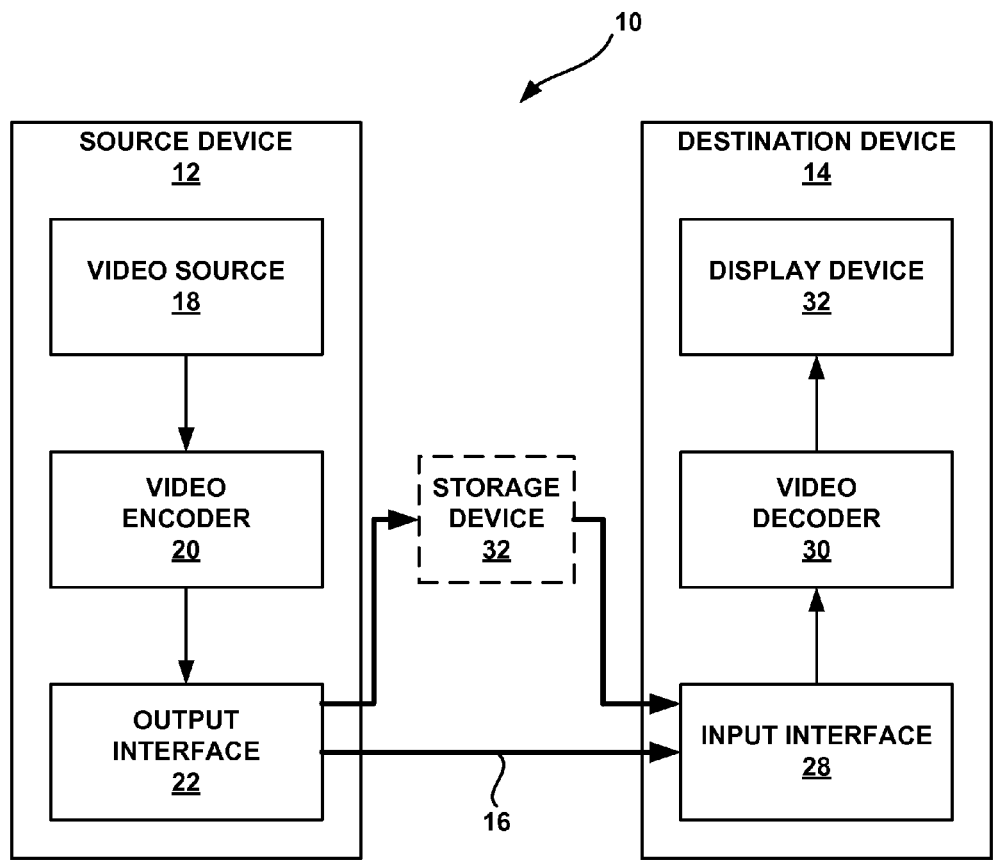
FIG. 4 is a block diagram illustrating an example video encoding and decoding system that may utilize the techniques described in this disclosure.

FIG. 4 is a block diagram illustrating an example video encoding and decoding system 10 that may utilize the techniques described in this disclosure. As shown in FIG. 4, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 4, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications. The captured, pre-captured, or computer-generated video may be encoded by video encoder 12. The encoded video data may be transmitted directly to destination device 14 via output interface 22 of source device 20. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server. In some examples, such syntax elements may include syntax elements signaling intra-coding modes as described in this disclosure.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the HEVC standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263. The techniques described in this disclosure may be implemented within such a coding process.

Although not shown in FIG. 4, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In addition to operating according to a video compression standard, video encoder 20 and video decoder 30 may perform techniques described herein for partitioning coding units. A video encoder, such as video encoder 20, may determine and encode partitioning schemes, e.g., as residual quadtree structures comprising split flags for transform units. A video decoder, such as video decoder 30, may determine partitioning schemes for transform units that are decoded from an encoded video bitstream received and entropy decoded by the video decoder. Video encoder 20 may arrange a coding unit into TU partitions according to the partitioning schemes. Video decoder 30 reconstructs the TU partitions to decode the video data.

As described above, a video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU.

Figure 5:
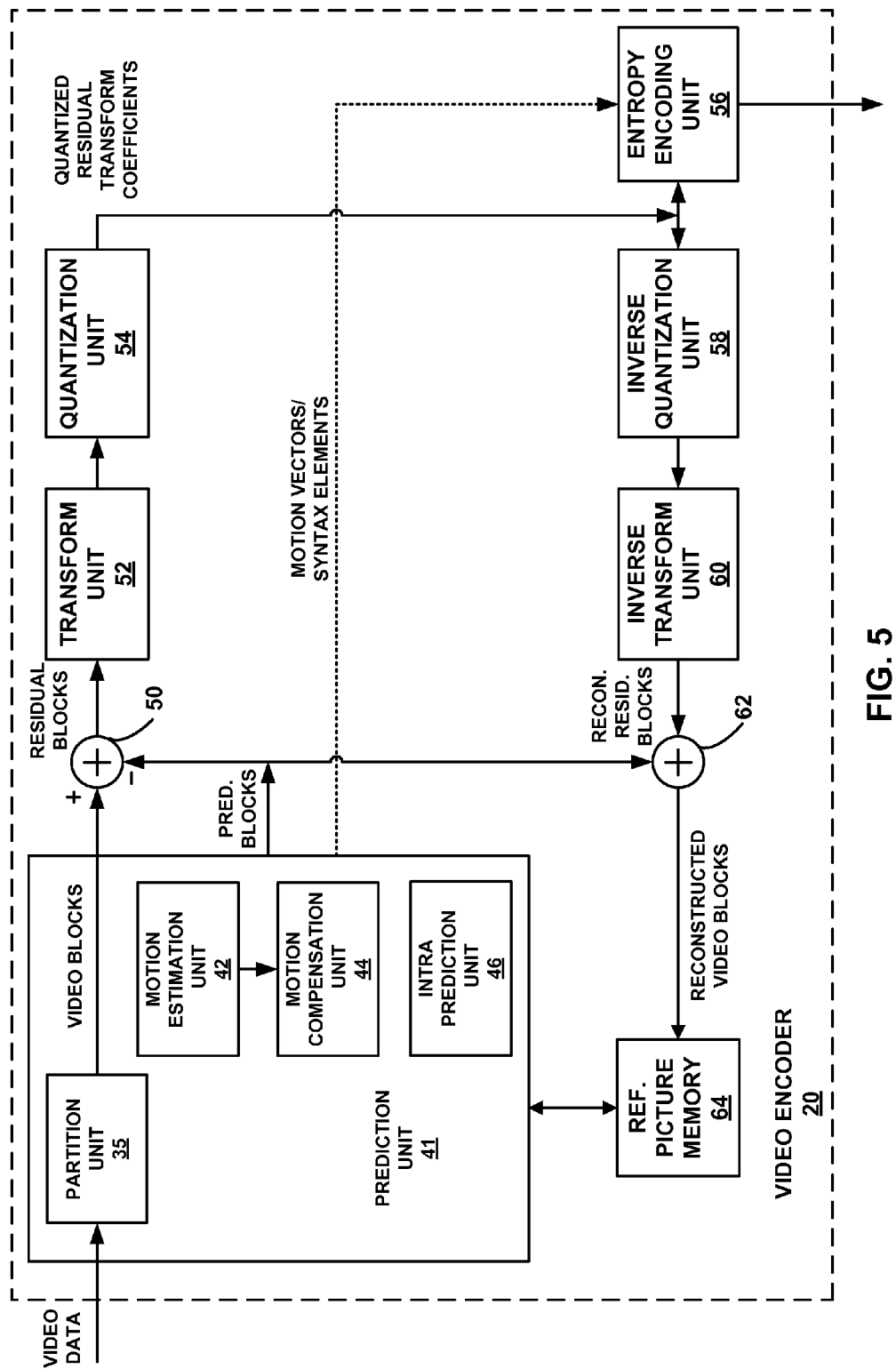
FIG. 5 is a block diagram illustrating an example video encoder that may implement the techniques described in this disclosure.

FIG. 5 is a block diagram illustrating an example video encoder 20 that may implement the techniques described in this disclosure. Video encoder 20 may perform intra- and inter-coding of video blocks within video slices. In the example of FIG. 5, video encoder 20 includes prediction unit 41, reference picture memory 64, summer 50, transform unit 52, quantization unit 54, and entropy encoding unit 56. Prediction unit 41 includes partition unit 35, motion estimation unit 42, motion compensation unit 44, and intra prediction unit 46. For video block reconstruction, video encoder 20 also includes inverse quantization unit 58, inverse transform unit 60, and summer 62. A deblocking filter (not shown in FIG. 5) may also be included to filter block boundaries to remove blockiness artifacts from reconstructed video. If desired, the deblocking filter would typically filter the output of summer 62. Additional loop filters (in loop or post loop) may also be used in addition to the deblocking filter.

Video encoder 20 generally illustrates the components that encode video blocks within a video slice to be encoded. The slice may be divided into multiple video blocks (and possibly into sets of video blocks referred to as tiles). Prediction unit 41 may select one of a plurality of possible coding modes, such as one of a plurality of intra coding modes or one of a plurality of inter coding modes, for the current video block based on error results (e.g., coding rate and the level of distortion). Prediction unit 41 may provide the resulting intra- or inter-coded block to summer 50 to generate residual block data and to summer 62 to reconstruct the encoded block for use as a reference picture.

Prediction unit 41 may provide various techniques for defining a partitioning scheme for one of the plurality of video components independently of other video components, as described in this disclosure. In another aspect, prediction unit 41 may determine whether to define a partitioning scheme for at least one of the plurality of video components of a video block independently of the other video components based on one or more properties of the video block. In some examples, the properties may include at least one of block size, picture type, block partition, or motion information.

As illustrated in FIG. 5, video encoder 20 receives video data, and partition unit 35 may partition the data into video blocks. This partitioning may also include partitioning video data into slices, tiles, or other larger units, as well as video block partitioning, e.g., according to a residual quadtree structure of LCUs and CUs to produce PU's and TU's. In one example, partition unit 35 may partition blocks of video data such as LCU's into sub-blocks such as CU's, PU's and TU's. For example, partition unit 35 may partition blocks of video data based on evaluation of previous partitioning schemes in previous coding passes. For example, partition unit 35 may initially partition a frame or slice into LCUs, and partition each of the LCUs into sub-CUs based on a rate-distortion analysis (e.g., rate-distortion optimization) in conjunction with prediction unit 41. Accordingly, although partition unit 35 is shown in FIG. 5 as a separate block for purposes of illustration, the partitioning functions performed by partition unit 35 may be integrated with the mode selection and prediction functions of prediction unit 41, particularly where the rate-distortion analysis performed by prediction unit 41 may be used to determine, at least in part, aspects of the partitioning applied to an LCU to produce CU's, sub-CU's, PU's and TU's. In general, prediction unit 41, in conjunction with partition unit 35, may produce a quadtree data structure indicative of partitioning of an LCU into sub-CUs. Leaf-node CUs of the quadtree may include one or more PUs and one or more TUs.

As described above, a series of split flags can be used to define a RQT structure. Thus, partition unit 35 and/or prediction unit 41 may partition a CU into one or more TUs and output a series of split flags to entropy encoding unit 56. In one example, partition unit 35 and/or prediction unit 41 may partition a CU such that each video component may have an RQT structure that is determined independently of at least one other video component RQT structure. For example, the RQT partitioning structure for the luma component (i.e., Y) may be defined independently from the RQT partitioning structure of the chroma components (i.e., U and V). In one example, the Y component can have its own RQT tree, defined as RQT1, and the U and V components can share a second RQT tree, defined as RQT2. The two trees may be independent, which means that a split decision in the Y component does not necessarily apply to the corresponding split decision for the U and V chroma components.

In this example, if RQT2 has a split flag=1 at a given level in the quad-tree, both U and V components are divided into smaller blocks at this level. Further, in another example, when two RQT trees are used for three video components, any number of combinations of two video components may share an RQT tree. In another example, three RQT trees can be independently defined, one for each of Y, U, and V, e.g., as RQT1, RQT2, and RQT3. Thus, partition unit 35 and/or prediction unit 41 may be configured to partition video data using any and all combinations of shared and independently defined RQT for each of the color components.

In one example, the number of RQT structures and the video components that use each of the RQT structures may be adaptively determined by partition unit 35 and/or prediction unit 41 and signaled either explicitly or implicitly by video encoder 20. For example, the decision that Y, U, and V share the same tree (i.e., the same partitioning scheme), or some of them share a tree, or each of them has its own independently defined tree, can be explicitly signaled by video encoder 20 at the CU header or in some high level syntax.

In another example, the decision that Y, U, and V share the same tree, or some of them share a tree, or each of them has its own independently defined tree, may be adaptively determined by partition unit 35 and/or prediction unit 41. This adaptive determination may be based on any property of a CU or other video block, such as, e.g., block size, picture type, block partition type (e.g., 2N×2N, N×2N), motion information, etc. For example, if the block size of a CU is equal to a maximum block size, this may signal that each video component has its own RQT structure. Using such properties, a video encoder, such as video encoder 20, may decide, and a video decoder, such as video decoder 30, may infer, the RQT scheme applied among the luma and chroma components (i.e., same RQT, two independent RQT's (one for luma, and one shared by two chroma components), or three independent RQT's), such that explicit signaling may not be needed.

As described above, a maximum depth (i.e., level) value may be defined for a quad-tree, where the maximum depth value indicates the how far splitting can occur from the root level. In some examples, partition unit 35 and/or prediction unit 41 may be configured to define a maximum depth(level) independently for each RQT structure. For example, an RQT structure for Y may have a maximum depth that is different than a maximum depth of the RQT structure for U or a maximum depth of the RQT structure for V. As an example, the RQT structure of Y may have a maximum depth of 2, while the RQT structure of U has a maximum depth of 1 and the RQT structure of V has a maximum depth of 1. Also, in some examples, the U and V components may have different maximum depths. Providing a maximum depth for each RQT structure may allow a video decoder, such as video decoder 30, to stop parsing a CU for split flags if the maximum depth has been reached. In one example, where Y has a RQT structure, RQT1, and U and V have the same RQT structure, RQT2, the maximum depth(level) for RQT1 may be defined as MAX_RQT_DEPTH_LUMA, and the maximum depth(level) for RQT2 may be defined MAX_RQT_DEPTH_CHROMA. In one example, MAX_RQT_DEPTH_LUMA and MAX_RQT_DEPTH_CHROMA may be transmitted by video encoder 20 in the encoded bitstream, for access and decoding by a video decoder, such as video decoder 30, using high level syntax.

It should be noted that if a current level of an RQT tree is at the pre-defined maximum level (depth), a split flag does not need to be encoded or decoded to indicate if the current block is further split into smaller transform blocks. That is, a video encoder, such as video encoder 20, does not provide any further split flags beyond a maximum depth level, and a video decoder, such as video decoder 30, need not parse for additional splitting flags beyond a maximum depth level. Independently defining maximum levels for the luma and chroma components may provide another way to independently define the partitioning for the luma and chroma components.

Figure 6:
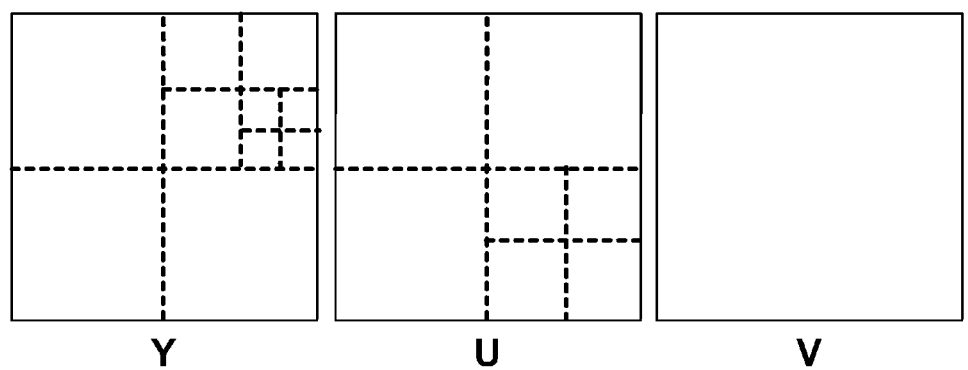
FIG. 6 is a conceptual diagram illustrating an example of a quad-tree decomposition structures for each color component of a transform unit.

FIG. 6 is a conceptual diagram illustrating an example of quad-tree decomposition where independent quad-tree decompositions are provided for each video component. As illustrated in FIG. 6, the Y and U components are partitioned at the root node and the V is not partitioned at the root node. Each of Y and U are further partitioned, but do not share common partitions beyond the root node partition. The partitioning illustrated in FIG. 6 may be signaled using three sets of split flags in a manner similar to the signal of split flags described above with respect to FIG. 2. For the sake of brevity a complete detailed discussion of the signaling of split flags for each of Y, U, and V in FIG. 6 is not described, but reference is made to the discussion of split flag signaling described above with respect to FIGS. 1 and 2. As described in detail below, when more than one RQT structure is used, such as RQT1 (for Y) and RQT2 (for U and V), or RQT1 (for Y), RQT2 (for U) and RQT3 (for V), the encoding of at least one of the RQT structures can be based on an already encoded RQT structure (e.g., of another color component). For example, if RQT1 is used for Y and RQT2 is used for U and V, RQT2 may be encoded based at least in part on RQT1.

Referring again to FIG. 5, intra prediction unit 46 within prediction unit 41 may perform intra-predictive coding of the current video block relative to one or more neighboring blocks in the same frame or slice as the current block to be coded to provide spatial compression. Motion estimation unit 42 and motion compensation unit 44 within prediction unit 41 perform inter-predictive coding of the current video block relative to one or more predictive blocks in one or more reference pictures to provide temporal compression.

If inter prediction rather than intra prediction is selected for a current video block, motion estimation unit 42 may be configured to determine the inter-prediction mode for a video slice according to a predetermined pattern for a video sequence. The predetermined pattern may designate video slices in the sequence as P slices, B slices or generalized P/B (GPB) slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

In inter-coding, a predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44, e.g., along with other syntax elements.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block to produce a predictive block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy coding unit 56. For example, intra-prediction unit 46 may provide signaling, such as one or more syntax elements, to indicate a selected intra mode. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction unit 41 generates the predictive block for the current video block, video encoder 20 forms a residual video block by subtracting the predictive block from the current video block. The residual video data in the residual block may be included in one or more TUs and applied to transform unit 52. Transform unit 52 transforms the residual video data into residual transform coefficients using a transform, such as a discrete cosine transform (DCT) or a conceptually similar transform. Transform unit 52 may convert the residual video data from a pixel domain to a transform domain, such as a frequency domain.

Transform unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

As described above, HEVC WD6 includes a coded block flag (CBF) syntax element that indicates if a block of transform coefficients or transform coefficient levels includes any non-zero transform coefficients. In one example, at each level, a syntax element referred to as coded block flag (cbf) and a split flag may be encoded by video encoder 20. The cbf may be used to indicate if there are any non-zero coefficients for a transform at the current level and/or further split transform blocks. If cbf=0, this means that there are no non-zero coefficients. In this case, split or not split will give the same results. So, there is no need to transmit a split flag (i.e., a default value, normally 0 is used for split), as the split flags becomes redundant. Accordingly, in this example, if cbf=0 for a level of the RQT, the video encoder 20 does not send, and a video decoder, such as video decoder 30, does not receive, a split flag. Instead, a split flag=0 may be inferred from cbf=0. In this manner, the number of split flags that are transmitted may be reduced. This may be particularly useful in the case where each color component includes an RQT. Thus, partition unit 35 and/or prediction unit 41 may be configured to generate and output split flags that define RQTs for each of the color components to entropy encoding unit 56 based on the value of cbf.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Following quantization, entropy coding unit 56 entropy codes the quantized transform coefficients. Further, entropy coding unit 56 entropy codes syntax elements, such as the predictive syntax elements described above. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, a context may be based on neighboring blocks. Following the entropy coding by entropy coding unit 56, the encoded bitstream may be transmitted to another device (e.g., video decoder 30) or archived for later transmission or retrieval. In some examples, video encoder 20 may utilize a predefined scan order to scan the quantized transform coefficients to produce a serialized vector that can be entropy encoded. Entropy encoding may also determine the compression ratio. In other examples, video encoder 20 may perform an adaptive scan. After scanning the quantized transform coefficients to form a one-dimensional vector, video encoder 20 may entropy encode the one-dimensional vector In addition to entropy coding the quantized transform coefficients, entropy coding unit 56 entropy encodes syntax elements, such as split flags. In one example, a split flag can be encoded using CABAC with contexts. The contexts for the CABAC coding of split flags for one RQT (e.g., RQT2) can be selected using the value of corresponding split flags in the RQT tree of another component (e.g., RQT1, which has been encoded before RQT2 for the current component). For example, if an RQT tree of Y, RQT1, is encoded before an RQT tree of UV, RQT2, the split flags of RQT2 can be CABAC coded with CABAC contexts selected based on the values of corresponding split flags in RQT1 (e.g., split flags that correspond to the same levels as the split flags being coded). In one example, when the split flag for level 0 of RQT2 is encoded, the value of the split flag at level 0 of RQT1 may be used to select the CABAC context for coding of the split flag at level 0 of RQT2. Hence, the context for coding a split flag in RQT2 may be determined based at least in part on the value of a corresponding split flag in RQT1. One or more rules, functions, or equations may be specified for use in selecting the context of a split flag in RQT2 based on the value of a split flag in RQT1. For example, if the value of a split flag for RQT1 is zero, a first context may be selected for a split flag for RQT2 and if the value of a split flag for RQT1 is one, a second context may be selected for the split flag or RQT2. In another example, a map defining all contexts split flags of RQT2 may be selected based on the value of one or more split flags for RQT2. In other examples, the selected context can be used for other types of entropy coding such as CAVLC or PIPE.

In another example, if Y, U, and V each have their own RQT structures and the RQT structures of Y and U are encoded before the RQT structure of V, when encoding the split flag at level 0 of the RQT structure of V, a function (splitY, splitU) can be used to select the context, where splitY is the value of the corresponding split flag in the RQT tree for Y, and splitU is the value of the corresponding split flag in the RQT tree for U. In another example, if Y, U, and V each have their own RQT structures and the RQT structures of Y and U are encoded before the RQT structure of V, when encoding the split flag at level 0 of the RQT structure of V, a function (splitU) can be used to select the context, where splitU is the value of the corresponding split flag in the RQT tree for U. The function may be defined in any of a variety of ways found to yield suitable context selections, e.g., that promote coding efficiency.

Figure 7:
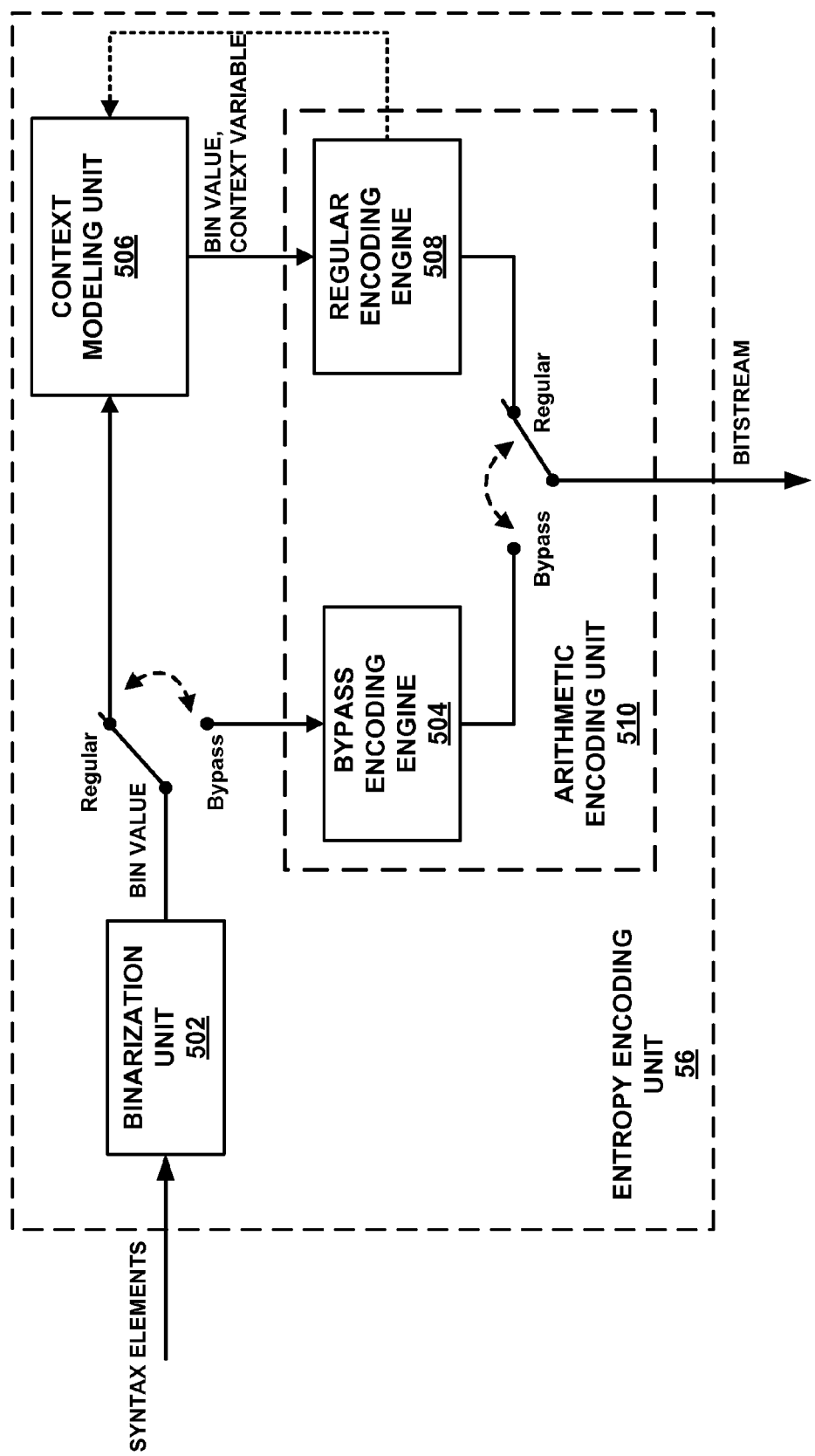
FIG. 7 is a block diagram illustrating an example of an entropy encoder that may implement the techniques described in this disclosure.

FIG. 7 is a block diagram that illustrates an example entropy encoding unit 56 that may implement the techniques described in this disclosure. In one example, entropy encoding unit 56 illustrated in FIG. 5 may be a CABAC encoder. The example entropy encoding unit 56 may include a binarization unit 502, an arithmetic encoding unit 510, which includes a bypass encoding engine 504 and a regular encoding engine 508, and a context modeling unit 506.

Entropy encoding unit 56 may receive one or more syntax elements, such as, the split flag syntax elements described above. Binarization unit 502 receives a syntax element and produces a bin string (i.e., binary string). Binarization unit 502 may use, for example, any one or combination of the following techniques to produce a bin string: fixed length coding, unary coding, truncated unary coding, truncated Rice coding, Golomb coding, exponential Golomb coding, and Golomb-Rice coding. Further, in some cases, binarization unit 502 may receive a syntax element as a binary string and simply pass-through the bin values.

Arithmetic encoding unit 510 is configured to receive a bin string from binarization unit 502 and perform arithmetic encoding on the bin string. As shown in FIG. 7, arithmetic encoding unit 510 may receive bin values from a bypass path or the regular coding path. Bin values that follow the bypass path may be bin values identified as by-pass coded and bin values that follow the regular encoding path may be identified as CABAC-coded. Consistent with the CABAC process described above, in the case where arithmetic encoding unit 510 receives bin values from a bypass path, bypass encoding engine 504 may perform arithmetic encoding on bin values without utilizing an adaptive context assigned to a bin value. In one example, bypass encoding engine 504 may assume equal probabilities for possible values of a bin.

In the case where arithmetic encoding unit 510 receives bin values through the regular path, context modeling unit 506 may provide a context variable (e.g., a context state), such that regular encoding engine 508 may perform arithmetic encoding based on the context assignments provided by context modeling unit 506. The context assignments may be defined according to a video coding standard, such as HEVC. The context models may be stored in memory. In one example, a context for CABAC coding a split flag may be determined based on the value of another split flag as described above. Context modeling unit 506 may include a series of indexed tables and/or utilize mapping functions to determine a context and a context state for a particular bin. After encoding a bin value, regular encoding engine 508 may update a context based on the actual bin values.

Figure 8:
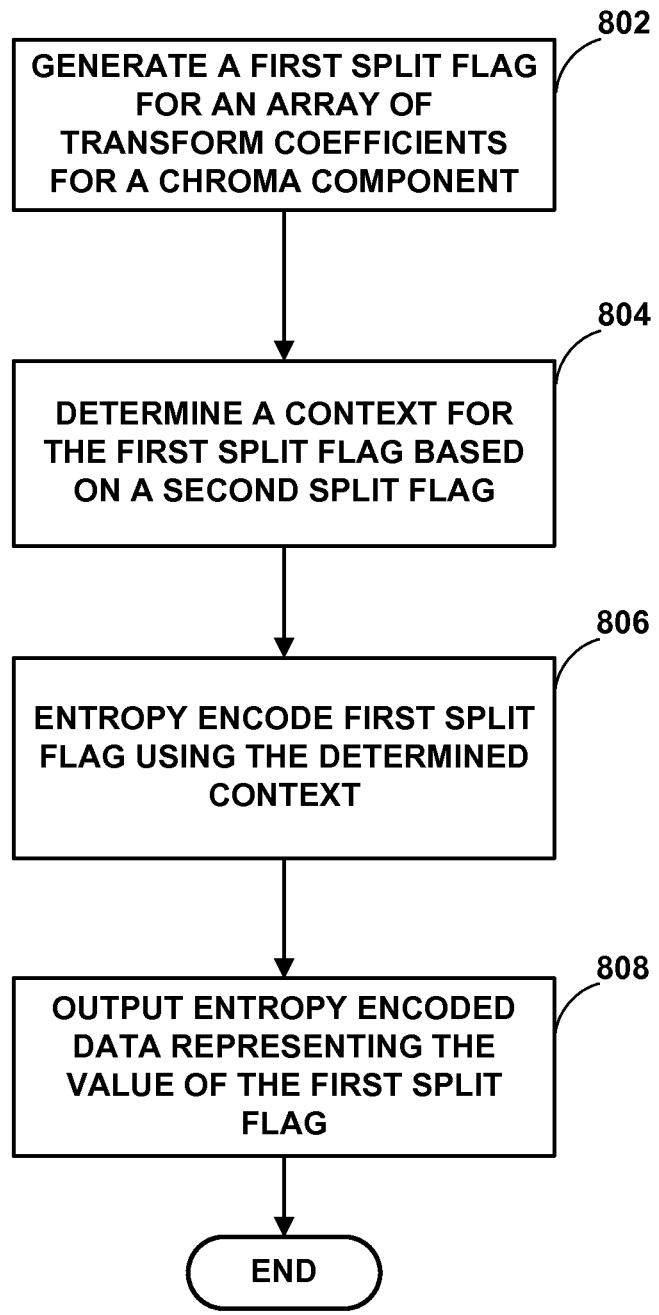
FIG. 8 is a flowchart illustrating an example method for encoding video data according to the techniques described in this disclosure.

FIG. 8 is a flowchart illustrating an example method for encoding video data according to the techniques described in this disclosure. Partition unit 35 generates a first split flag, wherein the value of the first split flag indicates whether an array of transform coefficients for a first chroma component of video data is divided into smaller transform blocks (802). Entropy coding unit 56 determines a context for the first split flag, wherein the context is based at least in part on a value of a second split flag associated with an array of transform coefficients for a second component of video data (804). The second component of video data may be either the luma or second chroma component of video data. Thus, the value of a split flag associated with another RQT may determine the context of the first split flag. Entropy coding unit 56 entropy encodes the first split flag based on the determined context using context adaptive binary arithmetic coding (CABAC) (806). Entropy coding unit 56 outputs entropy encoded data representing the value of the first split flag as part of a bitstream (808).

In this manner, video encoder 20 of FIG. 5 represents an example of a video encoder configured to generate a first split flag, wherein the value of the first split flag indicates whether more than one transform operation is associated with an array of transform coefficients for a first chroma component of video data, determine a context for the first split flag, wherein the context is based at least in part on a value of a second split flag associated with an array of transform coefficients for a luma component of video data, entropy encode the first split flag based on the determined context using context adaptive binary arithmetic coding (CABAC), and output entropy encoded data representing the value of the first split flag as part of a bitstream.

Figure 9:
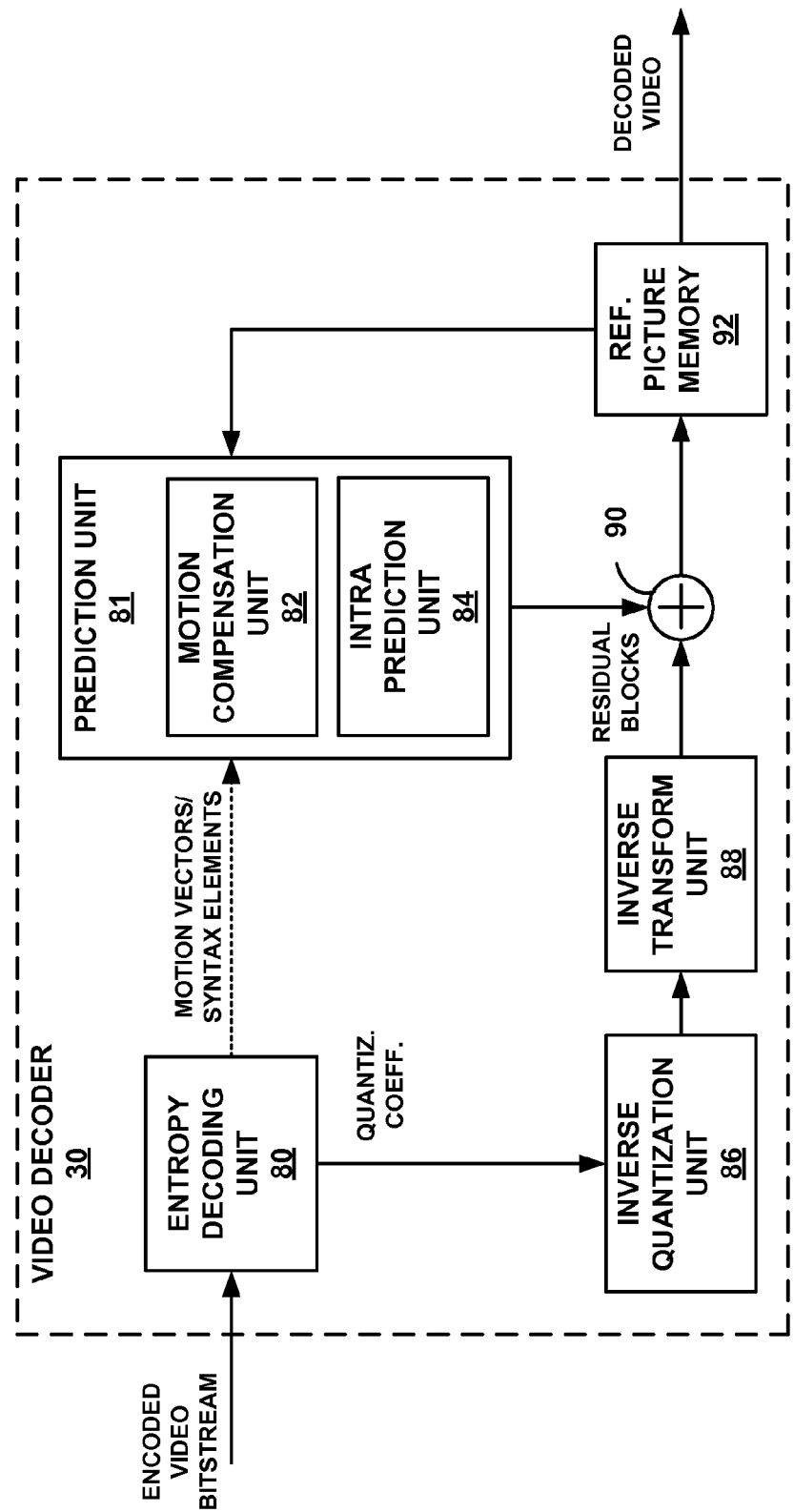
FIG. 9 is a block diagram illustrating an example video decoder that may implement the techniques described in this disclosure.

FIG. 9 is a block diagram illustrating an example video decoder 30 that may implement the techniques described in this disclosure. In the example of FIG. 9, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84. Video decoder 30 may, in some examples, perform a decoding pass generally reciprocal to the encoding pass described with respect to video encoder 20 from FIG. 5.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction unit 81. Video decoder 30 may receive the syntax elements at the video slice level and/or the video block level.

Figure 10:
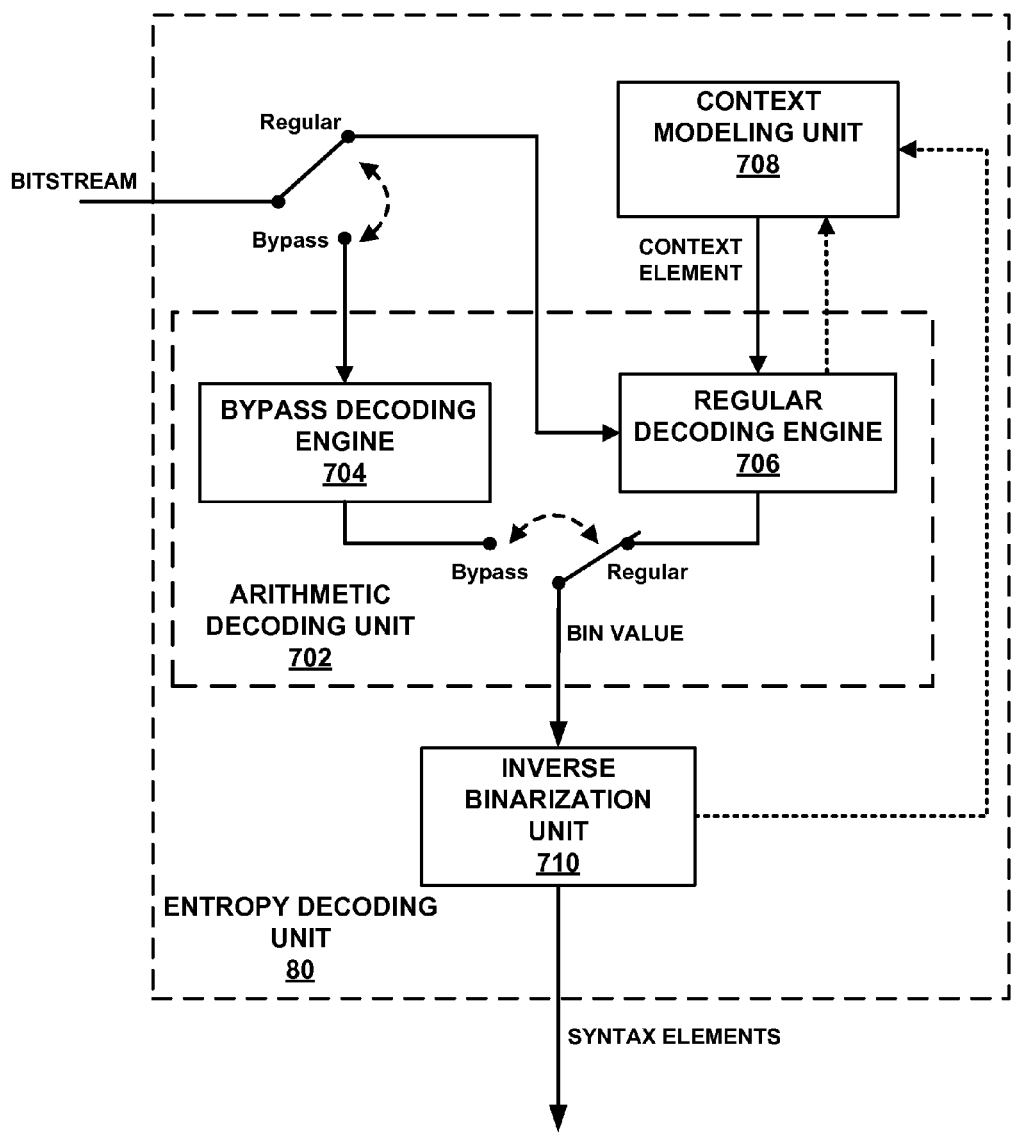
FIG. 10 is a block diagram illustrating an example of an entropy decoder that may implement the techniques described in this disclosure.

FIG. 10 is a block diagram that illustrates an example entropy decoding unit 80 that may implement the techniques described in this disclosure. Entropy decoding unit 80 receives an entropy encoded bitstream and decodes syntax elements from the bitstream. Syntax elements may include the split flag syntax elements described above. The example entropy decoding unit 80 in FIG. 10 includes an arithmetic decoding unit 702, which may include a bypass decoding engine 704 and a regular decoding engine 706. The example entropy decoding unit 80 also includes context modeling unit 708 and inverse binarization unit 710. The example entropy decoding unit 80 may perform the reciprocal functions of the example entropy encoding unit 56 described with respect to FIG. 5. In this manner, entropy decoding unit 80 may perform entropy decoding based on the techniques described herein.

Arithmetic decoding unit 702 receives an encoded bit stream. As shown in FIG. 10, arithmetic decoding unit 702 may process encoded bin values according to a bypass path or the regular coding path. An indication whether an encoded bin value should be processed according to a bypass path or a regular pass may be signaled in the bitstream with higher level syntax. Consistent with the CABAC process described above, in the case where arithmetic decoding unit 702 receives bin values from a bypass path, bypass decoding engine 704 may perform arithmetic encoding on bin values without utilizing a context assigned to a bin value. In one example, bypass decoding engine 704 may assume equal probabilities for possible values of a bin.

In the case where arithmetic decoding unit 702 receives bin values through the regular path, context modeling unit 708 may provide a context variable, such that regular decoding engine 706 may perform arithmetic encoding based on the context assignments provided by context modeling unit 708. The context assignments may be defined according to a video coding standard, such as HEVC. The context models may be stored in memory. In one example, a context for a split flag may be determined based on the value of another split flag as described above. Context modeling unit 708 may include a series of indexed tables and/or utilize mapping functions to determine a context and a context variable portion of an encoded bitstream. After decoding a bin value, regular coding engine 706, may update a context state value based on the decoded bin values. Further, inverse binarization unit 710 may perform an inverse binarization on a bin value and use a bin matching function to determine if a bin value is valid. The inverse binarization unit 710 may also update the context modeling unit based on the matching determination. Thus, the inverse binarization unit 710 outputs syntax elements according to a context adaptive decoding technique.

Referring again to FIG. 9, when the video frame is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

When the video slice is coded as an intra-coded (I) slice, intra prediction unit 84 of prediction unit 81 may generate prediction data for a video block of the current video slice based on a signaled intra prediction mode and data from previously decoded blocks of the current frame or picture. Intra-prediction unit 84 can identify most probable intra-prediction modes for a block being decoded in the same manner described above for video encoder 20. Intra-prediction unit 84 can parse a first bit to determine if the actual intra-prediction mode for the block being decoded is one of the most probable intra-prediction mode or one of the remaining intra-prediction modes. If the actual mode is one of the most probable modes, a code signaled in the bitstream may indicate which of the most probable modes is to be selected. If the first bit indicates that the actual mode is not one of the most probable modes, then intra-prediction unit 84 can determine the actual intra-prediction mode from among the set of remaining modes based on a received codeword. The signaling of the remaining mode may use a fixed length codeword. Intra-prediction unit 84 may then use the selected mode to decode and reconstruct the block.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Inverse transform unit 88 applies an inverse transform, e.g., an inverse DCT, an inverse integer transform, or a conceptually similar inverse transform process, to the transform coefficients in order to produce residual blocks in the pixel domain. Inverse transform unit 88 may be configured to apply inverse transforms according to an to the TU partitioning schemes described herein. In this manner, inverse transform unit 88 may parse a group of transform coefficients and perform transforms based on the values of one or more split flags.

After prediction unit 81 generates the predictive block for the current video block based on either intra-prediction or motion compensation, video decoder 30 forms a decoded video block by summing the residual blocks from inverse transform unit 88 with the corresponding predictive blocks generated by prediction unit 81. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 3.

Figure 11:
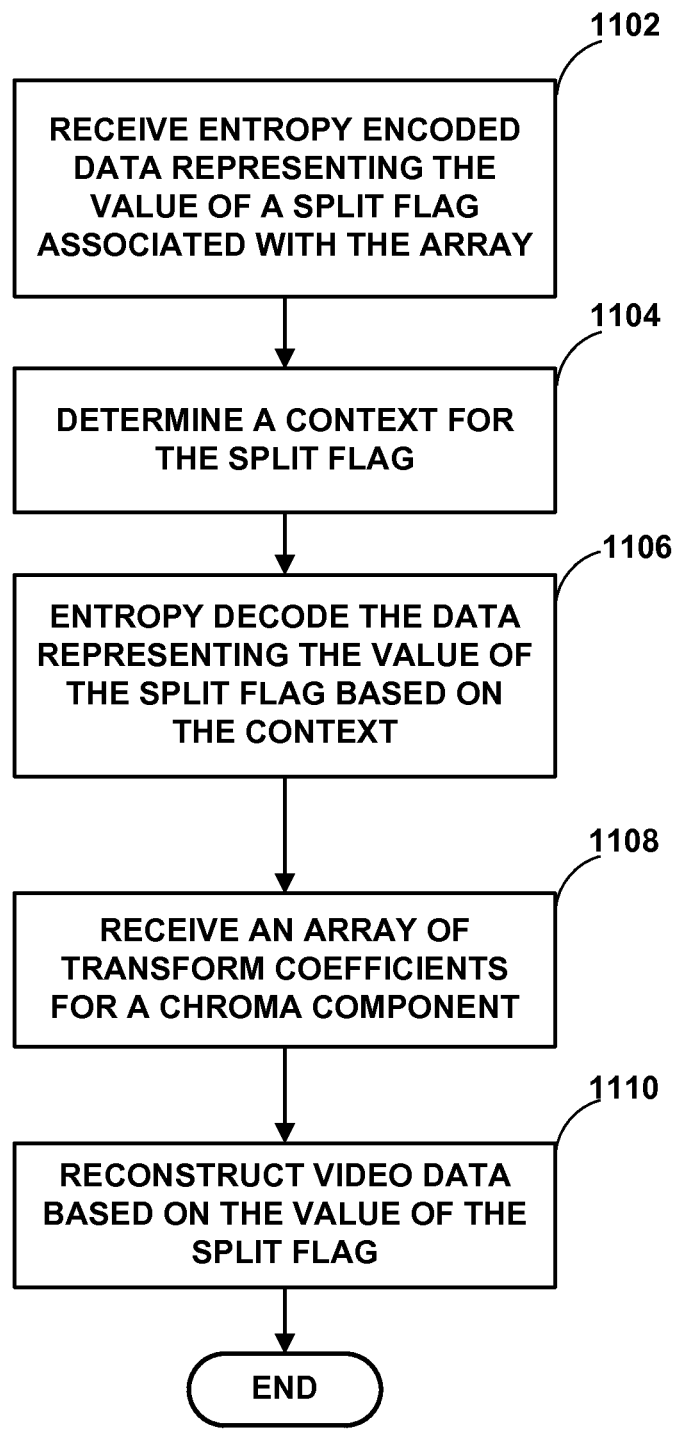
FIG. 11 is a flowchart illustrating an example method for decoding video data according to the techniques described in this disclosure.

FIG. 11 is a flowchart illustrating an example method for decoding video data according to the techniques described in this disclosure. Entropy decoding unit 80 receives entropy encoded data representing the value of a first split flag associated with the array of transform coefficients (1102). Entropy decoding unit 80 determines a context for the entropy encoded data representing the first split flag (1104). As described above, the context may be based at least in part on a value of a second split flag associated with an array of transform coefficients for a luma component of video data. The array of transform coefficients for the luma component and the array of transform coefficients for the chroma component of video data may be included in the same CU or TU. The entropy decoding unit 80 entropy decodes the data representing the value of the first flag based on the determined context using context adaptive binary arithmetic coding (CABAC) (1106). Inverse transform unit 88 receives an array of transform coefficients for a first chroma component of video data (1108). In some examples, the allocation of bits in a bitstream for the first array of transform coefficients may be based on the values of the split flags. The video decoder 30 reconstructs video data based on the value of the first split flag (1110).

In this manner, video decoder 30 of FIG. 10 represents an example of a video decoder configured to receive entropy encoded data representing the value of a first split flag associated with an array of transform coefficients for a first chroma component of video data, wherein the value of the first split flag indicates whether the array of transform coefficients for the first chroma component is divided into smaller transform blocks, determine a context for the entropy encoded data representing the first split flag, wherein the context is based at least in part on a value of a second split flag associated with an array of transform coefficients for a second component of video data, entropy decode the data representing the value of the first flag based on the determined context using context adaptive binary arithmetic coding (CABAC) and reconstruct video data based on the value of the first split flag. As described above, the value of the second split flag directly map a context for the first split flag or provide a map from which the context for the first split flag may be derived.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving entropy encoded data representing a value of a first split flag associated with an array of transform coefficients for a first chroma component of the video data, wherein the value of the first split flag indicates whether the array of transform coefficients for the first chroma component is divided into smaller transform blocks at a level within a first residual quad tree (RQT) partitioning structure, and wherein the first chroma component is partitioned according to the first RQT partitioning structure;
   determining that at least one of a luma component or a second chroma component of the video data is included in a previously-decoded component of the video data with respect to the first chroma component being decoded, wherein the previously-decoded component of the video data is partitioned according to a second RQT partitioning structure;
   determining a context for decoding the entropy encoded data representing the first split flag according to context adaptive binary arithmetic coding (CABAC) at least in part by using a value of a second split flag associated with an array of transform coefficients for the previously-decoded component of the video data, wherein the second split flag is at a corresponding level within the second RQT partitioning structure with respect to the level associated with the first split flag within the first RQT partitioning structure;
   based on the determination that at least one of the luma component or the second chroma component of the video data has been decoded prior to the first luma component being decoded, entropy decoding the data representing the value of the first split flag according to CABAC using the context determined for the first split flag; and
   reconstructing the video data based on the value of the first split flag.

2. The method of claim 1, wherein the previously-decoded component of the video data comprises the luma component of the video data, and wherein the second chroma component of the video data is partitioned according to a third RQT partitioning structure, the method further comprising:
   determining whether the value of the first split flag further indicates whether a corresponding array of transform coefficients at a corresponding level within the third RQT partitioning structure with respect to the level of the first split flag within the first RQT partitioning structure for the second chroma component of the video data is divided into smaller transform blocks based at least in part on one of a block size, a picture type, a block partition, or motion information associated with the video data.

3. The method of claim 1, wherein the previously-decoded component comprises the luma component of the video data, and wherein the value of the first split flag further indicates whether a corresponding array of transform coefficients at a corresponding level within the third RQT partitioning structure with respect to the level of the first split flag within the first RQT partitioning structure for the second chroma component of the video data is divided into smaller transform blocks.

4. The method of claim 1, wherein the previously-decoded component of the video data comprises both of the luma component and the second chroma component, wherein the second split flag is associated with the array of transform coefficients for the luma component of the video data, and wherein determining the context for decoding the entropy encoded data representing the first split flag comprises determining the context further based at least in part on a value of a third split flag associated with an array of transform coefficients for the second chroma component of the video data.

5. The method of claim 1, wherein reconstructing the video data comprises performing an inverse transform on a transform block to generate corresponding residual values for the first chroma component of video data.

6. A video decoding device comprising:
   a memory; and
   one or more processors configured to:
   receive entropy encoded data representing a value of a first split flag associated with an array of transform coefficients for a first chroma component of video data, wherein the value of the first split flag indicates whether the array of transform coefficients for the first chroma component is divided into smaller transform blocks at a level within a first residual quad tree (RQT) partitioning structure, and wherein the first chroma component is partitioned according to the first RQT partitioning structure;
   determining that at least one of a luma component or a second chroma component of the video data is included in a previously-decoded component of the video data with respect to the first chroma component being decoded, wherein the previously-decoded component of the video data is partitioned according to a second RQT partitioning structure;

determine a context for decoding the entropy encoded data representing the first split flag according to context adaptive binary arithmetic coding (CABAC) at least in part by using a value of a second split flag associated with an array of transform coefficients for the previously-decoded component of the video data, wherein the second split flag is at a corresponding level within the second RQT partitioning structure with respect to the level associated with the first split flag within the first RQT partitioning structure;

based on the determination that at least one of the luma component or the second chroma component of the video data has been decoded prior to the first luma component being decoded, entropy decode the data representing the value of the first split flag according to CABAC using the context determined for the first split flag; and reconstruct the video data based on the value of the first split flag.

7. The video decoding device of claim 6, wherein the previously-decoded component of the video data comprises the luma component of the video data, wherein the second chroma component of the video data is partitioned according to a third RQT partitioning, and wherein the one or more processors are further configured to determine whether the value of the first split flag further indicates whether a corresponding array of transform coefficients at a corresponding level within the third RQT partitioning structure with respect to the level of the first split flag within the first RQT partitioning structure for the second chroma component of the video data is divided into smaller transform blocks based at least in part on one of a block size, a picture type, a block partition, or motion information associated with the video data.

8. The video decoding device of claim 6, previously-decoded component comprises the luma component of the video data, and wherein the value of the first split flag further indicates whether a corresponding array of transform coefficients at a corresponding level within the third RQT partitioning structure with respect to the level of the first split flag within the first RQT partitioning structure for the second chroma component of the video data is divided into smaller transform blocks.

9. The video decoding device of claim 6, wherein the previously-decoded component of the video data comprises both of the luma component and the second chroma component, wherein the second split flag is associated with the array of transform coefficients for the luma component of the video data, and wherein to determine the context for decoding the entropy encoded data representing the first split flag, the one or more processors are further configured to determine the context further based at least in part on a value of a third split flag associated with an array of transform coefficients for the second chroma component of the video data.

10. The video decoding device of claim 6, wherein, to reconstruct the video data, the one or more processors are configured to perform an inverse transform on a transform block to generate corresponding residual values for the first chroma component of video data.

11. The video decoding device of claim 6, wherein the video decoding device comprises at least one of:
an integrated circuit;
a microprocessor; or
a wireless communication device.

12. A non-transitory computer-readable medium comprising instructions stored thereon that when executed cause one or more processors of a device for decoding video data to:

receive entropy encoded data representing a value of a first split flag associated with an array of transform coefficients for a first chroma component of video data, wherein the value of the first split flag indicates whether the array of transform coefficients for the first chroma component is divided into smaller transform blocks at a level within a first residual quad tree (RQT) partitioning structure, and wherein the first chroma component is partitioned according to the first RQT partitioning structure;

determine that at least one of a luma component or a second chroma component of the video data is included in a previously-decoded component of the video data with respect to the first chroma component being decoded, wherein the previously-decoded component of the video data is partitioned according to a second RQT partitioning structure determine a context for decoding the entropy encoded data representing the first split flag according to context adaptive binary arithmetic coding (CABAC), at least in part by using a value of a second split flag associated with an array of transform coefficients for the previously-decoded component of the video data, wherein the second split flag is at a corresponding level within the second RQT partitioning structure with respect to the level associated with the first split flag within the first RQT partitioning structure;

based on the determination that at least one of the luma component or the second chroma component of the video data has been decoded prior to the first luma component being decoded, entropy decode the data representing the value of the first split flag according to CABAC using the context determined for the first split flag; and reconstruct the video data based on the value of the first split flag.

13. The non-transitory computer-readable medium of claim 12, wherein the previously-decoded component of the video data comprises the luma component of the video data, wherein the second chroma component of the video data is partitioned according to a third RQT partitioning structure, and wherein the instructions, when executed further cause the one or more processors to determine whether the value of the first split flag further indicates whether a corresponding array of transform coefficients at a corresponding level within the third RQT partitioning structure with respect to the level of the first split flag within the first RQT partitioning structure for the second chroma component of the video data is divided into smaller transform blocks based at least in part on one of a block size, a picture type, a block partition, or motion information associated with the video data.

14. The non-transitory computer-readable medium of claim 12, wherein the previously-decoded component comprises the luma component of the video data, and wherein the value of the first split flag further indicates whether a corresponding array of transform coefficients at a corresponding level within the third RQT partitioning structure with respect to the level of the first split flag within the first RQT partitioning structure for the second chroma component of the video data is divided into smaller transform blocks.

15. The non-transitory computer-readable medium of claim 12, wherein the previously-decoded component of the video data comprises both of the luma component and the second chroma component, wherein the second split flag is associated with the array of transform coefficients for the luma component of the video data, and wherein the instructions that cause the one or more processors to determine the context for decoding the entropy encoded data representing the first split flag comprise instructions that cause the one or more processors to determine the context further based at least in part on a value of a third split flag associated with an array of transform coefficients for the second chroma component of the video data.

16. The non-transitory computer-readable medium of claim 12, wherein the instructions that cause the one or more processors to reconstruct the video data comprise instructions that, when executed, cause the one or more processors to perform an inverse transform on a transform block to generate corresponding residual values for the first chroma component of the video data.

17. An apparatus for decoding video data, the apparatus comprising:
  means for receiving entropy encoded data representing a value of a first split flag associated with an array of transform coefficients for a first chroma component of the video data, wherein the value of the first split flag indicates whether the array of transform coefficients for the first chroma component is divided into smaller transform blocks at a level within a first residual quad tree (RQT) partitioning structure, and wherein the first chroma component is partitioned according to the first RQT partitioning structure;
  means for determining that at least one of a luma component or a second chroma component of the video data is included in a previously-decoded component of the video data with respect to the first chroma component being decoded, wherein the previously-decoded component of the video data is partitioned according to a second RQT partitioning structure;
  means for determining a context for decoding the entropy encoded data representing the first split flag according to context adaptive binary arithmetic coding (CABAC) at least in part by using a value of a second split flag associated with an array of transform coefficients for the previously-decoded component of the video data, wherein the second split flag is at a corresponding level within the second RQT partitioning structure with respect to the level associated with the first split flag within the first RQT partitioning structure;
  means for entropy decoding based on the determination that at least one of the luma component or the second chroma component of the video data has been decoded prior to the first luma component being decoded, the data representing the value of the first split flag according to CABAC using the context determined for the first split flag; and
  means for reconstructing the video data based on the value of the first split flag.

18. A method of encoding video data, the method comprising:
  generating a value of a first split flag to indicate whether an array of transform coefficients for a first chroma component of the video data is divided into smaller transform blocks at a level within a first residual quad tree (RQT) partitioning structure, wherein the first chroma component is partitioned according to the first RQT partitioning structure;
  determining that at least one of a luma component or a second chroma component of the video data is included in a previously-encoded component of the video data with respect to the first luma component being encoded, wherein the previously-encoded component of the video data is partitioned according to a second RQT partitioning structure;
  determining a context for encoding the first split flag according to context adaptive binary arithmetic coding (CABAC) based at least in part on a value of a second split flag associated with an array of transform coefficients for the previously-encoded component of the video data;
  based on the determination that at least one of the luma component or the second chroma component of the video data has been encoded prior to the first chroma component being encoded, entropy encoding the first split flag according to CABAC using the context determined for the first split flag; and
  outputting entropy encoded data representing the value of the first split flag as part of a bitstream.

19. The method of claim 18, wherein the previously-encoded component of the video data comprises the luma component of the video data, and wherein the second chroma component of the video data is partitioned according to a third RQT partitioning structure, the method further comprising:
  determining whether the value of the first split flag further indicates whether a corresponding array of transform coefficients at a corresponding level within the third RQT partitioning structure with respect to the level of the first split flag within the first RQT partitioning structure for the second chroma component of the video data is divided into smaller transform blocks based at least in part on one of a block size, a picture type, a block partition, or motion information associated with the video data.

20. The method of claim 19, wherein the value of the first split flag further indicates whether a corresponding array of transform coefficients at a corresponding level within the third RQT partitioning structure with respect to the level of the first split flag within the first RQT partitioning structure for the second chroma component of the video data is divided into smaller transform blocks.

21. The method of claim 20, wherein the second split flag is associated with the array of transform coefficients for the luma component of the video data, and wherein determining the context for encoding the first split flag comprises determining the context further based at least in part on a value of a third split flag associated with an array of transform coefficients for the second chroma component of the video data.

22. A video encoding device comprising:
  a memory; and
  one or more processors configured to:
  generate a value of a first split flag to indicate whether an array of transform coefficients for a first chroma component of the video data is divided into smaller transform blocks at a level within a first residual quad tree (RQT) partitioning structure, wherein the first chroma component is partitioned according to the first RQT partitioning structure;
  determine that at least one of a luma component or a second chroma component of the video data is included in a previously-encoded component of the video data with respect to the first luma component being encoded, wherein the previously-encoded component of the video data is partitioned according to a second RQT partitioning structure;

determine a context for encoding the first split flag according to context adaptive binary arithmetic coding (CABAC) based at least in part on a value of a second split flag associated with an array of transform coefficients for the previously-encoded component of the video data;

based on the determination that at least one of the luma component or the second chroma component of the video data has been encoded prior to the first chroma component being encoded, entropy encode the first split flag according to CABAC using the context determined for the first split flag; and output entropy encoded data representing the value of the first split flag as part of a bitstream.

23. The video encoding device of claim 22, wherein the previously-encoded component of the video data comprises the luma component of the video data, wherein the second chroma component of the video data is partitioned according to a third RQT partitioning structure, and wherein the one or more processors are further configured to determine whether the value of the first split flag further indicates whether a corresponding array of transform coefficients at a corresponding level within the third RQT partitioning structure with respect to the level of the first split flag within the first RQT partitioning structure for the second chroma component of video data is divided into smaller transform blocks based at least in part on one of a block size, a picture type, a block partition, or motion information associated with the video data.

24. The video encoding device of claim 23, wherein the value of the first split flag further indicates whether a corresponding array of transform coefficients at a corresponding level within the third RQT partitioning structure with respect to the level of the first split flag within the first RQT partitioning structure for the second chroma component of video data is divided into smaller transform blocks.

25. The video encoding device of claim 22, wherein the second split flag is associated with the array of transform coefficients for the luma component of the video data, and wherein to determine the context for encoding the first split flag, the one or more processors are configured to determine the context further based at least in part on a value of a third split flag associated with an array of transform coefficients for the second chroma component of video data.

26. The video encoding device of claim 22, wherein the video encoding device comprises at least one of:
an integrated circuit;
a microprocessor; or
a wireless communication device.

27. A non-transitory computer-readable medium comprising instructions stored thereon that when executed cause one or more processors of a device for encoding video data to:
generate a value of a first split flag to indicate whether an array of transform coefficients for a first chroma component of the video data is divided into smaller transform blocks at a level within a first residual quad tree (RQT) partitioning structure, wherein the first chroma component is partitioned according to the first RQT partitioning structure;
determine that at least one of a luma component or a second chroma component of the video data is included in a previously-encoded component of the video data with respect to the first luma component being encoded, wherein the previously-encoded component of the video data is partitioned according to a second RQT partitioning structure;

determine a context for encoding the first split flag according to context adaptive binary arithmetic coding (CABAC) based at least in part on a value of a second split flag associated with an array of transform coefficients for the previously-encoded component of the video data;

based on the determination that at least one of the luma component or the second chroma component of the video data has been encoded prior to the first chroma component being encoded, entropy encode the first split flag according to CABAC using the context determined for the first split flag; and output entropy encoded data representing the value of the first split flag as part of a bitstream.

28. The non-transitory computer-readable medium of claim 27, wherein the previously-encoded component of the video data comprises the luma component of the video data, wherein the second chroma component of the video data is partitioned according to a third RQT partitioning structure, and wherein the instructions, when executed, further cause the one or more processors to determine whether the value of the first split flag further indicates whether a corresponding array of transform coefficients at a corresponding level within the third RQT partitioning structure with respect to the level of the first split flag within the first RQT partitioning structure for the second chroma component of video data is divided into smaller transform blocks based at least in part on one of a block size, a picture type, a block partition, or motion information associated with the video data.

29. The non-transitory computer-readable medium of claim 28, wherein the value of the first split flag further indicates whether a corresponding array of transform coefficients at a corresponding level within the third RQT partitioning structure with respect to the level of the first split flag within the first RQT partitioning structure for the second chroma component of video data is divided into smaller transform blocks.

30. The non-transitory computer-readable medium of claim 27, wherein the second split flag is associated with the array of transform coefficients for the luma component of the video data, and wherein the instructions that cause the one or more processors to determine the context comprise instructions that, when executed, cause the one or more processors to determine the context further based at least in part on a value of a third split flag associated with an array of transform coefficients for a second chroma component of video data.

31. An apparatus for encoding video data comprising:
means for generating a a value of a first split flag to indicate whether an array of transform coefficients for a first chroma component of the video data is divided into smaller transform blocks at a level within a first residual quad tree (RQT) partitioning structure, wherein the first chroma component is partitioned according to the first RQT partitioning structure;
means for determining that at least one of a luma component or a second chroma component of the video data is included in a previously-encoded component of the video data with respect to the first luma component being encoded, wherein the previously-encoded component of the video data is partitioned according to a second RQT partitioning structure;
means for determining a context for encoding the first split flag according to context adaptive binary arithmetic coding (CABAC) based at least in part on a value of a second split flag associated with an array of transform coefficients for the previously-encoded component of the video data;

means for entropy encoding, based on the determination that at least one of the luma component or the second chroma component of the video data has been encoded prior to the first chroma component being encoded, the first split flag according to CABAC using the context determined for the first split flag; and means for outputting entropy encoded data representing the value of the first split flag as part of a bitstream.

32. The method of claim 4, wherein determining the context for decoding the entropy encoded data representing the first split flag comprises determining the context using a function of the value of the second split flag and the value of the third split flag.

33. The method of claim 21, wherein determining the context for encoding the entropy encoded data representing the first split flag comprises determining the context using a function of the value of the second split flag and the value of the third split flag.

* * * * *